(12) United States Patent
Chandrasekhar et al.

(10) Patent No.: US 9,482,880 B1
(45) Date of Patent: Nov. 1, 2016

(54) ELECTROCHROMIC EYEWEAR

(71) Applicant: Ashwin-Ushas Corporation, Inc., Holmdel, NJ (US)

(72) Inventors: Prasanna Chandrasekhar, Holmdel, NJ (US); Brian J. Zay, Hamilton, NJ (US); Edward J. Laganis, Hoboken, NJ (US); Vasily V. Romanov, Jersey City, NJ (US); Anthony J. LaRosa, Rockaway, NJ (US)

(73) Assignee: Ashwin-Ushas Corporation, Inc., Holmdel, NJ (US)

( * ) Notice: Subject to any disclaimer, the term of this patent is extended or adjusted under 35 U.S.C. 154(b) by 0 days.

(21) Appl. No.: 14/854,388

(22) Filed: Sep. 15, 2015

(51) Int. Cl.
| | |
|---|---|
| *G02C 1/00* | (2006.01) |
| *G02C 7/10* | (2006.01) |
| *G02C 5/14* | (2006.01) |
| *G02F 1/163* | (2006.01) |
| *G02F 1/133* | (2006.01) |
| *G02F 1/15* | (2006.01) |

(52) U.S. Cl.
CPC .............. *G02C 7/101* (2013.01); *G02C 5/146* (2013.01); *G02F 1/13318* (2013.01); *G02F 1/163* (2013.01); *G02C 2200/08* (2013.01); *G02F 2001/1515* (2013.01)

(58) Field of Classification Search
CPC .................... G02B 2027/0178; G02B 27/017; G02C 11/10; G02C 2202/16; G02C 7/102; G02C 7/104; G02C 7/12
USPC ................................ 351/49, 158, 41; 349/13
See application file for complete search history.

(56) References Cited

U.S. PATENT DOCUMENTS

| | | |
|---|---|---|
| 3,807,832 A | 4/1974 | Castellion |
| 3,844,636 A | 10/1974 | Maricle |
| 4,215,917 A | 8/1980 | Giglia |
| 4,272,163 A | 6/1981 | Samokhin |
| 4,304,465 A | 12/1981 | Diaz |
| 4,500,840 A | 2/1985 | Galwey |
| 4,529,873 A | 7/1985 | Ballmer |
| 4,559,122 A | 12/1985 | Folco |
| 4,586,792 A | 5/1986 | Yang |
| 4,618,218 A | 10/1986 | Shaw |
| 4,665,874 A | 5/1987 | Kawanabe et al. |
| 4,749,260 A | 6/1988 | Yang |
| 4,874,481 A | 10/1989 | Suzuki |
| 4,902,108 A | 2/1990 | Byker |

(Continued)

FOREIGN PATENT DOCUMENTS

| | | |
|---|---|---|
| CN | 102176102 | 9/2011 |
| CN | 202705536 | 1/2013 |

(Continued)

OTHER PUBLICATIONS (Non-edited textbook): Chandrasekhar, P. Conducting Polymers: Fundamentals and Applications. A Practical Approach, with foreword by Lawrence Dalton: Kluwer Academic Publishers (now Springer Verlag), Dordrecht, The Netherlands and Norwell, MA, USAM ISBN No. 0-7923-8564-0 (Aug. 1999).

(Continued)

*Primary Examiner* — Hung Dang
(74) *Attorney, Agent, or Firm* — Morgan Lewis & Bockius LLP (57) ABSTRACT

Electrochromic eyewear that include a removable electrochromic lens are provided herein.

30 Claims, 6 Drawing Sheets

(56) References Cited

U.S. PATENT DOCUMENTS

| | | | |
|---|---|---|---|
| 4,939,043 A | 7/1990 | Biricik | |
| 5,079,334 A | 1/1992 | Epstein | |
| 5,095,153 A | 3/1992 | Agnes | |
| 5,124,080 A | 6/1992 | Shabrang | |
| 5,137,991 A | 8/1992 | Epstein | |
| 5,159,031 A | 10/1992 | Epstein | |
| 5,164,465 A | 11/1992 | Epstein | |
| 5,173,443 A | 12/1992 | Biricik | |
| 5,182,585 A * | 1/1993 | Stoner | G02B 3/14 351/158 |
| 5,184,156 A | 2/1993 | Black | |
| 5,241,411 A | 8/1993 | Arribart | |
| 5,253,100 A | 10/1993 | Yang | |
| 5,373,305 A | 12/1994 | Lepore, Jr. | |
| 5,373,306 A | 12/1994 | Amore | |
| 5,413,739 A | 5/1995 | Coleman | |
| 5,441,629 A | 8/1995 | Kosaki | |
| 5,446,576 A | 8/1995 | Lynam | |
| 5,446,577 A | 8/1995 | Bennett | |
| 5,455,637 A | 10/1995 | Kallman | |
| 5,455,638 A | 10/1995 | Kallman | |
| 5,466,356 A | 11/1995 | Schneider | |
| 5,500,759 A | 3/1996 | Coleman | |
| 5,561,206 A | 10/1996 | Yamamoto | |
| 5,578,191 A | 11/1996 | Robert | |
| 5,608,567 A | 3/1997 | Grupp | |
| 5,657,150 A | 8/1997 | Kallman | |
| 5,728,943 A | 3/1998 | Colter, Jr. | |
| 5,835,185 A | 11/1998 | Kallman | |
| 5,864,419 A | 1/1999 | Lynam | |
| 5,900,720 A | 5/1999 | Kallman | |
| 5,951,844 A | 9/1999 | Jansen | |
| 5,969,847 A | 10/1999 | Coleman | |
| 5,973,818 A | 10/1999 | Sjursen | |
| 5,992,996 A * | 11/1999 | Sawyer | A61F 9/02 351/158 |
| 5,995,273 A | 11/1999 | Chandrasekhar | |
| 6,033,592 A | 3/2000 | Chandrasekhar | |
| 6,063,253 A | 5/2000 | Shreve | |
| 6,083,376 A | 7/2000 | Akram | |
| 6,089,721 A | 7/2000 | Schierbeek | |
| 6,099,117 A | 8/2000 | Gregory | |
| 6,115,177 A * | 9/2000 | Vossler | G02B 27/26 348/E13.023 |
| 6,130,772 A | 10/2000 | Cava | |
| 6,132,583 A | 10/2000 | Stone | |
| 6,189,835 B1 | 2/2001 | Kaufman | |
| 6,261,425 B1 | 7/2001 | Huang | |
| 6,267,853 B1 | 7/2001 | Dordi | |
| 6,270,647 B1 | 8/2001 | Graham | |
| 6,279,857 B1 | 8/2001 | Roth | |
| 6,294,060 B1 | 9/2001 | Webb | |
| 6,299,751 B1 | 10/2001 | Kaufman | |
| 6,299,753 B1 | 10/2001 | Chao | |
| 6,327,069 B1 | 12/2001 | Allemand | |
| 6,339,334 B1 | 1/2002 | Park | |
| 6,402,924 B1 | 6/2002 | Martin | |
| 6,409,903 B1 | 6/2002 | Chung | |
| 6,428,684 B1 | 8/2002 | Warburton | |
| 6,538,796 B1 | 3/2003 | Swanson | |
| 6,547,945 B2 | 4/2003 | Shallow | |
| 6,551,484 B2 | 4/2003 | Hey | |
| 6,607,652 B2 | 8/2003 | Webb | |
| 6,620,304 B1 | 9/2003 | Hoffacker | |
| 6,687,631 B2 | 2/2004 | Yoon | |
| 6,713,774 B2 | 3/2004 | DeSteese | |
| 6,733,909 B2 | 5/2004 | Ding | |
| 6,818,110 B1 | 11/2004 | Warren | |
| 6,837,978 B1 | 1/2005 | Hey | |
| 6,859,297 B2 | 2/2005 | Lee | |
| RE39,043 E | 3/2006 | Nakayama | |
| 7,033,466 B2 | 4/2006 | Riewe | |
| 7,156,965 B1 | 1/2007 | Li | |
| 7,180,649 B2 | 2/2007 | Morrison | |
| 7,219,860 B2 | 5/2007 | Wehner | |
| 7,223,323 B2 | 5/2007 | Yang | |
| 7,229,545 B2 | 6/2007 | Sewing | |
| 7,247,222 B2 | 7/2007 | Yang | |
| 7,270,891 B2 | 9/2007 | Roth | |
| 7,277,215 B2 | 10/2007 | Greer | |
| 7,306,332 B2 | 12/2007 | Chen | |
| 7,333,258 B2 | 2/2008 | Yang | |
| 7,342,708 B2 | 3/2008 | Ho | |
| RE40,218 E | 4/2008 | Landau | |
| 7,355,161 B2 | 4/2008 | Romig | |
| 7,374,283 B2 | 5/2008 | Blum | |
| 7,384,522 B2 | 6/2008 | Marszal | |
| 7,390,123 B2 | 6/2008 | Friedman | |
| 7,427,338 B2 | 9/2008 | Dordi | |
| 7,427,346 B2 | 9/2008 | Tom | |
| 7,449,098 B1 | 11/2008 | Mayer | |
| 7,500,747 B2 | 3/2009 | Howell | |
| 7,578,912 B2 | 8/2009 | Buehler | |
| 7,675,667 B2 | 3/2010 | Xu | |
| 7,686,938 B2 | 3/2010 | Gill | |
| 7,691,284 B2 | 4/2010 | Cumberland | |
| 7,704,352 B2 | 4/2010 | Lopatin | |
| 7,733,335 B2 | 6/2010 | Zehner | |
| 7,738,155 B2 | 6/2010 | Agrawal | |
| 7,761,053 B2 | 7/2010 | Kruzelecky | |
| 7,828,944 B2 | 11/2010 | Nagashima | |
| 7,874,666 B2 | 1/2011 | Xu | |
| 7,940,062 B1 | 5/2011 | Miller | |
| 7,951,902 B2 | 5/2011 | Sotzing | |
| 7,952,557 B2 | 5/2011 | Amundson | |
| 7,954,942 B2 | 6/2011 | Calilung | |
| 7,999,992 B2 | 8/2011 | Mazurkiewicz | |
| 8,005,526 B2 | 8/2011 | Martin | |
| 8,016,415 B2 | 9/2011 | Figler | |
| 8,017,217 B1 | 9/2011 | Gregoire | |
| 8,018,644 B2 | 9/2011 | Gustavsson | |
| 8,109,629 B2 | 2/2012 | Howell | |
| 8,133,369 B2 | 3/2012 | Tam | |
| 8,234,507 B2 | 7/2012 | Zhu | |
| 8,241,228 B1 | 8/2012 | Cohen | |
| 8,337,014 B2 | 12/2012 | Kokonaski | |
| 8,408,699 B2 | 4/2013 | Blum | |
| 8,434,863 B2 | 5/2013 | Howell | |
| 8,465,151 B2 | 6/2013 | Howell | |
| 8,496,790 B2 | 7/2013 | Wilson | |
| 8,500,983 B2 | 8/2013 | Ponnuswamy | |
| 8,541,174 B2 | 9/2013 | Wohlstadter | |
| 8,551,315 B2 | 10/2013 | Cohen | |
| 8,603,316 B2 | 12/2013 | Cohen | |
| 8,657,438 B2 | 2/2014 | Jacobs | |
| 8,708,483 B2 | 4/2014 | Kokonaski | |
| 8,741,590 B2 | 6/2014 | Heller | |
| 8,758,591 B2 | 6/2014 | Adeloju | |
| 8,783,864 B2 | 7/2014 | Matsui | |
| 8,902,486 B1 | 12/2014 | Chandrasekhar | |
| 8,931,896 B2 | 1/2015 | Blum | |
| 8,932,443 B2 | 1/2015 | Sto. Domingo | |
| 8,944,590 B2 | 2/2015 | Blum | |
| 9,018,019 B2 | 4/2015 | Parker | |
| 9,018,802 B2 | 4/2015 | Sun | |
| 2002/0157959 A1 | 10/2002 | Kronenberg | |
| 2002/0191270 A1 | 12/2002 | Lu | |
| 2003/0202249 A1 | 10/2003 | Schierbeek | |
| 2003/0214695 A1 | 11/2003 | Abramson | |
| 2003/0227663 A1 | 12/2003 | Agrawal | |
| 2004/0256222 A1 | 12/2004 | Griego | |
| 2006/0070883 A1 | 4/2006 | Bejan | |
| 2007/0008603 A1 | 1/2007 | Sotzing | |
| 2007/0103761 A1 | 5/2007 | Giron | |
| 2007/0215457 A1 | 9/2007 | Glassman | |
| 2008/0131773 A1 | 6/2008 | Lucas | |
| 2008/0245471 A1 | 10/2008 | Goad | |
| 2009/0067030 A1 | 3/2009 | Liu | |
| 2009/0096745 A1 | 4/2009 | Sprague | |
| 2009/0114537 A1 | 5/2009 | Bourgerette | |
| 2009/0203873 A1 | 8/2009 | Sotzing | |
| 2009/0213282 A1* | 8/2009 | Burlingame | G02C 7/101 349/13 |
| 2010/0253603 A1 | 10/2010 | Righi | |

(56) References Cited

U.S. PATENT DOCUMENTS

| | | |
|---|---|---|
| 2010/0280561 A1 | 11/2010 | Song |
| 2011/0111147 A1 | 5/2011 | Agrawal |
| 2011/0135837 A1 | 6/2011 | Burdis |
| 2011/0151317 A1 | 6/2011 | Giroud |
| 2011/0164303 A1 | 7/2011 | Hampp |
| 2011/0187684 A1 | 8/2011 | Amundson |
| 2011/0255142 A1 | 10/2011 | Ash |
| 2012/0205258 A1 | 8/2012 | Noble |
| 2012/0235900 A1 | 9/2012 | Border |
| 2013/0120821 A1 | 5/2013 | Chandrasekhar |
| 2013/0161600 A1 | 6/2013 | Sotzing |
| 2013/0235323 A1 | 9/2013 | Sotzing |
| 2013/0278989 A1 | 10/2013 | Lam |
| 2014/0097088 A1 | 4/2014 | Stowell |
| 2014/0268283 A1 | 9/2014 | Chandrasekhar |
| 2014/0284216 A1 | 9/2014 | MacNeil |
| 2015/0275385 A1 | 10/2015 | Chandrasekhar |

FOREIGN PATENT DOCUMENTS

| | | |
|---|---|---|
| CN | 203256361 | 10/2013 |
| CN | 103436946 | 12/2013 |
| CN | 103498134 | 1/2014 |
| CN | 203530467 | 4/2014 |
| EP | 0915189 | 5/1999 |
| EP | 0989209 | 3/2000 |
| EP | 1533400 | 5/2005 |
| EP | 2049943 | 4/2009 |
| WO | 9314436 | 7/1993 |
| WO | 9728484 | 8/1997 |
| WO | 9837453 | 8/1998 |
| WO | 9845504 | 10/1998 |
| WO | 0204715 | 1/2002 |
| WO | 02082172 | 10/2002 |
| WO | 04001100 | 12/2003 |
| WO | 2005050294 | 6/2005 |
| WO | 2007146862 | 12/2007 |
| WO | 2009058877 | 5/2009 |
| WO | 2009114965 | 9/2009 |
| WO | 2012158966 | 11/2012 |
| WO | 2015014292 | 2/2015 |

OTHER PUBLICATIONS

A. Masulaitis, et al., "Use of novel dopants and doping effects for broadband signature control in conducting polymer systems," The International Society for Optical Engineering, 2528:190-197 (1995).

Chad M. Amb et al.; "Propylenedioxythiophene (ProDOT)-phenylene copolymers allow a yellow-to-transmissive electrochrome," Polymer Chemistry, (2011) 2(4):812.

Chandrasekhar, P., et al., "High Performance Variable Emittance Devices for Spacecraft Application Based on Conducting Polymers Coupled with Ionic Liquids," AIP Conf. Proc. (2009) 1103:101-104.

Chandrasekhar, P., et al., "Large, Switchable Electrochromism in the Visible Through Far-Infrared in Conducting Polymer Devices," Adv. Funct. Mater. (2002). 12:95-103.

Chandrasekhar, P., Masulaitis, A.M.; Gumbs, R.W., "Novel Synthesis, Spectroelectrochemical, Electrochemical and Chronovoltabsorptometric Characterization of Poly(lsothianaphthene)" Synth. Met., (1990), 36(3), 303-326.

Chandrasekhar, P.; Gumbs, R.W., Novel Synthesis, Spectroelectrochemical, Electrochemical and Chronovoltabsorptometric Characterization of Family of Poly-(Aromatic Amines), Novel Processible Conducting Polymers. I. Poly(benzidines)', J. Electrochem. Soc., (1991), 138, 1337-1346.

Chandrasekhar, P.; Thorne, J.R.G., Hochstrasser, R.M., Third-order Nonlinear Optical Properties of Poly(diphenyl Amine) and Poly(4-Amino Biphenyl), Novel Processible Conducting Polymers', Appl. Phys. Lett., (1991), 59, 1661-3.

Chandrasekhar, P.; Wheeler, R.A.; Hoffmann, Roald, "Sigma Bond Cleavage in Coordinated Dioxygen: The Case of the u-Peroxo Complex [(THF)3Cl2V(III)(O22)-V(III)CL2(THF)3] and Vanadyl Formation in Solution", Inorg. Chim. Acta, (1987), 129:51-59.

Extended European Search Report and Written Opinion dated Jun. 9, 2015 for European Patent Application No. 12850225.

Fillion, E.; Fishlock, D.; Wilsily, A.; Goll, J. M., "Meldrum's Acids as Acylating Agents in the Catylitic Intramolecular Friedel-Crafts Reaction," J. Org. Chem. 2005, 70, 1316.

Gazotti, W.A.; Casalbore-Miceli, G.; Geri, A.; De Paoli, M.—A., "A Solid-State Electrochromic Device Based on Two Optically Complementary Conducting Polymers", Adv. Mat. 10, 60-64 (1998).

Groenendaal, L.; Jonas, F.; Freitag, D.; Pielartzik, H.; Reynolds, J.R., "Poly(3,4- ethylenedioxythiophene) and Its Deriatives: Past, Present and Future", Adv. Mat., 12, 481-494 (2000).

Guay, J.; Dao, L.H., "Formation of poly(4-phenylaniline) by electropolymerization of 4-aminobiphenyl or diphenylamine", J. Electroanal. Chem., 274, 135-142 (1989).

Guay, J.; Leclerc, M.; Dao, L.H., "Conducting polymer derived from 4-aminobiphenyl" J. Electroanal. Chem. Interfac. Electrochem., 251, 31-39 (1988).

Hotta, S.; Rughooputh, S.D.D.V.; Heeger, A.J.; Wudl, F., "Spectroscopic Studies of Soluble Poly(3-alkylthienylenes," Macromolecules, 20, 212 (1987).

Hsu, C-Y.; Lee, K-M.; Huang, J-H.; Justin Thomas, K.R.; Lin, J.T.; Ho, K-C., "A novel photoelectrochromic device with dual application based on poly(3,4-alkylenedioxytiophene) thin film and an organic dye", Journal of Power Sources, 185, 1505-1508 (2008).

International Search Report and Written Opinion dated Mar. 29, 2013 for PCT Appin No. PCT/US2012/065123.

International Search Report dated Feb. 3, 2014 for counterpart PCT Appln. No. PCT/US2013/032320.

Ivernale, M.A.; Seshadri, V.; Mamangun, D.M.D.; Ding, Y.; Filloramo, J; and Sotzing, G.A., "Polythieno[3,4-b]thiophene as an Optically Transparent Ion-Storage Layer," Chem. Mater. 2009, 21, 3332-3336.

Krishnamoorthy, K.; Ambade, A.V.; Kanungo, M.; Contractor, A.Q.; Kumar, A., "Rational design of an electorchromic polymer with high contrast in the visible region: dibenzyl substituted poly(3,4-propylenedioxythiohene)", J. Mat. Chem. 11, 2909-2911 (2001).

Leclerc, M.; Guay, J.; Dao, L.H., "Synthesis and properties of electrochromic polymers from toluidines", J. Electroanal. Chem. Interfac. Electrochem., 251, 21-29 (1988).

Li, H.; Xie, K.; Yao, M.; and Xin, C., "Variable Emissivity Infrared Electrochromic Device Based on Polyaniline Conducting Polymer," Synthetic Metals (2009) 159:1386-1388.

Lu, W., et al., "Use of Ionic Liquids for À-Conjugated Polymer Electrochemical Devices," Science (2002) 297:983-986.

Menon, R.; Yoon, C.O.; Moses, D; Heeger, A.J., "Metal-Insulator Transition in Doped Conducting Polymers", in Handbook of Conducting Polymers, 2nd Edition, p. 27, Ed by Skotheim, T.A.; Reynolds, J. (Eds.), CRC Press, Boca Rato, FL, USA, (1998).

Merve Icli-Ozkut et al.; "Substituent and heteroatom effects on the electrochromic properties of similar systems," Journal of Polymer Science Part A: Polymer Chemistry, (2011) 50(4):615-621.

Nguyen, M.T.; Dao, L.H., "Electrochemical, electrochromic, and conductive properties of poly(N-alkyldiphenylamine) polymers", J. Chem. Soc., Chem. Commun., 1221-1222 (1990).

Nguyen, M.T.; Dao, L.H., "Synthesis, characterization and properties of poly-(3methyldiphenylamine) and poly(3-methoxydiphenylamine)", J. Electroanal. Chem. Interfac. Electrochem., 289, 37-53 (1990).

P. Chandrasekhar, et al., "Far-IR Transparency and Dynamic Infrared Signature Control with Novel Conducting Polymer Systems," The International Society for Optical Engineering, 2528:169-180 (1995).

Padilla, J; Seshadri, V.; Filloramo, J.; Mino, W.K.; Mishra, S.P.; Radmard, B.; Kumar, A.; Sotzing, G.A.; and Otero, T.F., "High contrast solid-state electrochromic devices from substituted 3,4-propylenedioxythiophenes using the dual conjugated polymer approach," Synthetic Metals 2007, 157, 261-268.

(56) References Cited

OTHER PUBLICATIONS

Patil, A.O.; Ikenoue, Y.; Wudl, F.; Heeger A.J., J. Am. Chem. Soc., "Water Soluble Conducting Polymers," 109, 1858 (1987).

Ram, M.K.; Maccioni, E.; Nicolini, C., "The electrochromic response of polyaniline and its copolymeric systems", Thin Solid Films, 303, 27-33 (1997).

Reeves, B.D.; Grenier, C.R.G.; Argun, A.A.; Cirpan, A.; Cunningham, G.B.; McCarley, T.D.; and Reynolds, J.R., "Synthetic Methodology Toward New Propylenedioxythiophene Polymers", Polymer Preprints 45 (1), 284 (2004).

Sapp, S.A.; Sotzing, G.A.; Reynolds, J.R., "High Contrast Ratio and Fast-Switching Dual Polymer Electrochromic Devices", Chem. Mater., 10, 2101-2108 (1998).

Schwendeman, I.; Hickman, R.; Sonmez, G.; Schottland, P.; Zong, K.; Welsh, D.M.; and Reynolds, J.R., "Enhanced Contrast Dual Polymer Electrochromic Devices", Chem. Mater., 14, 3118-3122 (2002).

Tiefenbacher, K.; Rebek, Jr., "Selective Stabilization of Self-Assembled Hydrogen-Bonded Molecular Capsules Through A-A Interactions," J. Am. Chem. Soc. 2012, 134, 2914.

Unur, E.; Jung, J-H.; Mortimer, R.J.; and Reynolds J.R., "Dual-Polymer Electrochromic Film Characterization Using Bipotentiostatic Control", Chem. Mater., 20, 2328-2334 (2008).

Vasilyeva, S.V.; Unur, Ece; Walczak, R.M.; Donoghue E.P.; Rinzler, A.G.; and Reynolds, J.R., "Color Purity in Polymer Electrochromic Window Devices on Indium-Tin Oxide and Single-walled Carbon Nanotube Electrodes", Applied Materials and Interfaces, vol. 1, No. 10, 2288-2297 (2009).

Welsh, D.M.; Kumar, A.; Meijer, E.W.; Reynolds, J.R., "Enhanced Contrast Ratios and Rapid Switching in Electrochromics Based on Poly(3,4-propylenedioxythiophene) Deriatives", Adv. Mat. 11, 1379-1382 (1999).

Wermuth. The Practice of Medicinal Chemistry, 1996, chapter 13, pp. 203-237.

Written Opinion of the International Searching Authority dated Feb. 3, 2014 for counterpart PCT Appln. No. PCT/US2013/032320.

Youtube Video, "Electrochromic Ballistics Protection Spectacles Prototype," http://www.youtube.com/watch?v=Wn3II82SJXg (Apr. 17, 2013).

Youtube Video, "Electrochromic Glasses Prototype," http://www.youtube.com/watch?v=yDA-ZOYauMO (Jan. 10, 2013).

Autolab Application Note EC08, "Basic overview of the working principle of a potentiostat/galvanostat (PGSTAT)—Electrochemical cell setup," Dec. 20, 2011.

International Search Report and Written Opinion dated Jan. 30, 2015 for PCT Appln No. PCT/US2014/065170.

* cited by examiner

ELECTROCHROMIC EYEWEAR

FIELD OF THE INVENTION

The present invention relates generally to electrochromic eyewear and more particularly, but not exclusively, to electrochromic spectacles, goggles, and glasses, that may include an eyewear frame, electrochromic lenses, a light sensor, and a controller.

BACKGROUND OF THE INVENTION

Photochromics represent a fairly common technology in which the active material, typically incorporated into the lenses of eyeglasses, darkens in the presence of intense light and lightens in its absence. For instance, photochromic-based lenses commonly darken when exposed to bright sunlight and then lighten when the lenses are brought indoors. Drawbacks of photochromics include poor switching speed, high cost, and weight. Moreover, photochromic lenses often fail to operate or "switch" indoors, or in automobiles, because they require UV light in order to activate or switch.

As an alternative to photochromic materials, electrochromic materials provide a color change in response to an applied voltage. However, electrochromic materials have not found commercial success as a replacement for photochromics.

Accordingly, there is a need in the field for lenses and eyewear that may include materials, such as electrochromic materials, that may be wearable by a user with improved light/dark switching speeds and operate in a variety of conditions and environments.

SUMMARY OF THE INVENTION

Electrochromics, a less well-established technology in comparison to photochromics, change color or opacity in response to an applied voltage, which may be a small DC voltage. An active electrochromic material may include liquid crystals, metal oxides, organic polymers, organic materials, or other materials that may respond to an applied voltage with a change in color or opacity.

Certain technologies that include electrochromic materials have a variety of drawbacks. These drawbacks include: (1) a poor placement of photosensors both in terms of functionality and aesthetics, usually in an exterior position where its output can be distorted by exposure to direct sunlight or direct light from a bright spotlight; (2) a lack of automated function; (3) a lack of seamless integration of the components, such as a photosensor, controller unit, power source, electrical connections or wiring, and an active electrochromic lens; and (4) a lack of amenability to inexpensive and facile manufacture.

The devices of the invention provide electrochromic eyewear that answer the needs in the field. The various components of the electrochromic devices of the invention are provided as automated eyewear in which a continuously variable electrochromic state is automatically adjusted such that the light level incident at the user's eye is provided at a constant, preselected level. These various components, which are incorporated into the eyewear frame and may be hidden from view, include an electrochromic lens or lenses that may contain the active electrochromic material. For example, in certain embodiments of the invention, the electrochromic eyewear may include one to three lenses.

The components of the invention may include a protective outer layer that may be adhered to the electrochromic lens and thereby protects the lens from external ballistic impacts, and other threats, which may allow the electrochromic eyewear to conform to the ANSI Z87.1 (2014) specification. Components of the invention may also include a photosensor that may be placed behind the electrochromic lens, which may thereby sample a light level at a user's eye. The photosensor may be disposed at the end of a conical cavity on or within the electrochromic eyewear so that it may be protected from direct sunlight or direct incidence of spotlights or other bright lights.

The components of the invention may also include a controller or microprocessor-based microcontroller on which may reside a control program whereby the input from the photosensor may be used to control the electrochromic lens using a control algorithm such that the light level at the user's eyes is always provided at a preselected level. Indeed, the photosensor and the controller of the invention may be used to maintain a certain preselected level of light at the eyes by modifying the color or opacity of the electrochromic lens in response to varying light levels in the user's surroundings. In conjunction with the controller, the components of the invention may also include a power source such as a rechargeable Li battery.

Moreover, the components of the invention may include one or more of a control interface, input/output interfaces (e.g., an ON/OFF switch), a micro-USB recharge port, and various low power LEDs indicating an ON/OFF status, battery charge, and other statuses. In addition, the components of the invention may include a flexible circuit, and electrical connections and wiring incorporated into the flexible circuit, which may be used to direct certain wires through a hinge of the electrochromic eyewear.

In certain aspects, the present invention includes electrochromic eyewear that may include an eyewear frame. The eyewear frame of the electrochromic eyewear may include a first arm and a first hinge that connects the first arm to the eyewear frame. The eyewear frame may include a second arm and a second hinge that connects the second arm to the eyewear frame. Moreover, the eyewear frame may include a photosensor cavity having a conically-shaped cross-section. The electrochromic eyewear may also include an electrochromic lens that may be connected to the electrochromic eyewear frame that covers the photosensor cavity. The electrochromic eyewear may include a photosensor that may be contained within the photosensor cavity and may be configured to receive light and convert such light to a photosensor potential.

The photosensor may be positioned behind a portion of the electrochromic lens, on the side closest to a user's eyes.

The electrochromic eyewear may include a controller that may be contained within at least one of the first and second arms. The controller may be disposed in electrical communication with the photosensor and the electrochromic lens. The controller may also be configured to deliver a voltage to the electrochromic lens in response to a signal from the photosensor potential. Additionally, the electrochromic eyewear may include a power source that may be contained within at least one of the first and second arms. The power source may be disposed in electrical communication with the controller.

In another aspect, the electrochromic eyewear of the invention may include an eyewear frame having a first arm and a second arm. In certain embodiments, at least one of the first and second arms may include a hinge that may connect the arm to the eyewear frame. The hinge may include a set of interconnected knuckles and an electrical passthrough that may be disposed within the set of interconnected knuckles. The arm may rotate upon the hinge between an open and closed position. The electrochromic eyewear may include an electrochromic lens that may be connected to the eyewear frame, where the electrochromic lens may include electrical contacts. The electrochromic eyewear may include a controller that may be contained within at least one of the first and second arms. The controller may be disposed in electrical communication with the electrochromic lens. The controller may be configured to deliver a voltage to the electrochromic lens to vary the transmittance (% T) of the electrochromic lens in response to a stimulus transmitted to the controller (e.g., a photosensor potential). The electrochromic eyewear may also include a power source that may be contained within at least one of the first and second arms in electrical communication with the controller. Moreover, the electrochromic eyewear may include a flexible circuit that may be configured to maintain electrical communication between the electrochromic lens and the controller when at least one of the first and second marks is in their open or closed position. The flexible circuit may include electrical contact pads connected to the eyewear frame and may be configured to releaseably contact the electrical contacts of the electrochromic lens. The flexible circuit may include a flexible electrical conduit that connects the electrical contact pads to the controller through the electrical passthrough.

In a further aspect, the present invention may include eyewear having removable electrochromic lenses. The eyewear may include an eyewear frame having first and second arms that may be connected by first and second hinges, respectively, to the eyewear frame. The eyewear frame may include a front portion and a rear portion. The front portion may include a fastener that may be configured to releaseably connect the front portion to the rear portion. The rear portion may include an electrochromic lens snap fitting and spring loaded electrochromic lens contact pads. The eyewear may include an electrochromic lens that may be disposed between the front portion and the rear portion of the eyewear frame. The electrochromic lens snap fitting and the spring loaded electrochromic lens contact pads may be configured to releaseably connect the electrochromic lens to the rear portion.

The eyewear may include a photosensor connected to the rear portion of the eyewear frame. The photosensor may be configured to received light and convert such light to a photosensor potential. Additionally, the eyewear may include a controller that may be contained within at least one of the first and second arms. The controller may be disposed in electrical communication with the electrochromic lens and the photosensor. The controller may be configured to deliver a voltage to the electrochromic lens through the spring loaded electrochromic lens contact pads in response to the photosensor potential.

The present invention provides electrochromic eyewear, that may be in the form of sunglasses, that incorporate an electrochromic lens, a photosensor, a power source, and controller. Moreover the electrochromic eyewear includes a flexible circuit that allows the wiring for the various powered components to be seamlessly contained within the electrochromic eyewear. Indeed, the various elements of the present invention allow a user to both (1) adjust the arms of the eyewear without any loss of function; and (2) move through a variety of lighted environments without a change in light level at the user's eyes, even in the presence of direct sunlight.

BRIEF DESCRIPTION OF THE DRAWINGS

The foregoing summary and the following detailed description of the exemplary embodiments of the present invention may be further understood when read in conjunction with the appended drawings, in which.

DETAILED DESCRIPTION OF THE INVENTION

The present invention relates generally to electrochromic eyewear. Electrochromic eyewear may include, but is not limited to, spectacles, goggles, and glasses. Such electrochromic eyewear may find application in industrial safety, in the construction industry, in sports (e.g., extreme sports), in medicine (e.g., for protection of patients with ailments that cause discomfort with varying light levels), and for general recreational use. In certain specific embodiments, the invention may relate to electrochromic eyewear in which the electrochromic function may be automated through the incorporation of components including, but not limited to, a sensor, a power source, a microprocessor-based controller, certain electrical connections that allow for communication between the powered components (e.g., power source, controller, sensor), and a flexible circuit, which may be incorporated into the electrochromic eyewear.

Figure 1:
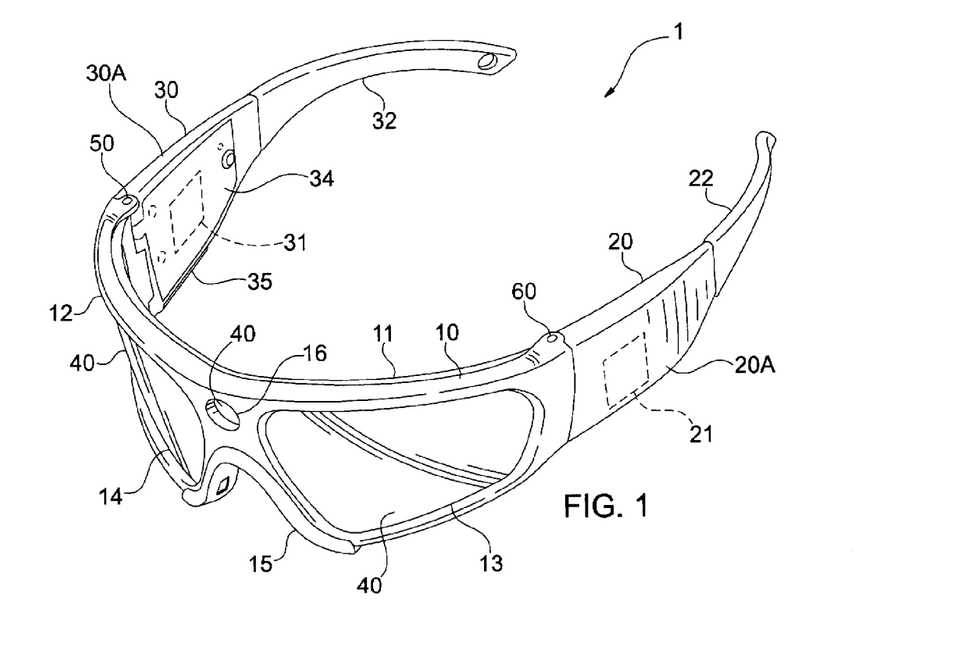
FIG. 1 schematically illustrates a perspective view of exemplary electrochromic eyewear of the invention.
Figure 2:
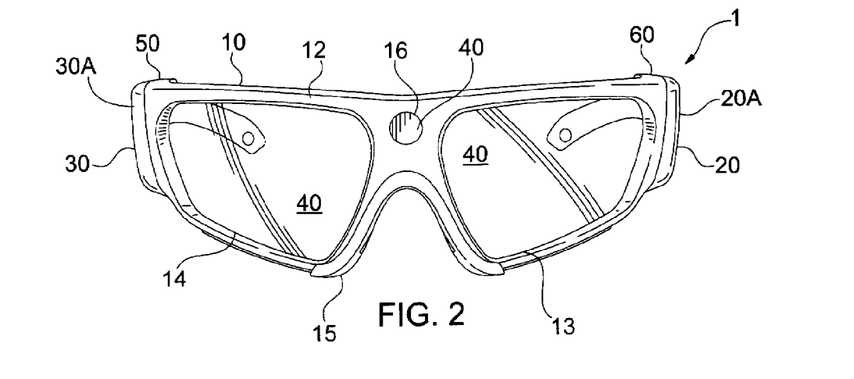
FIG. 2 schematically illustrates a front view of exemplary electrochromic eyewear of the invention.
Figure 3:
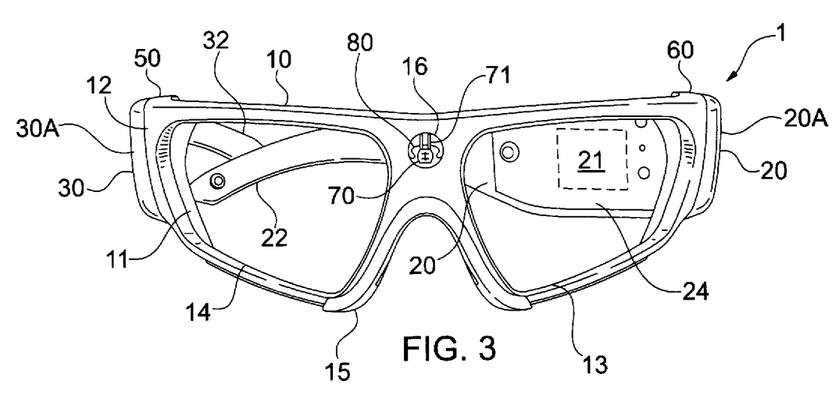
FIG. 3 schematically illustrates a front view of exemplary electrochromic eyewear with the electrochromic lens removed.

Referring now to the figures, wherein like elements are numbered alike throughout, FIGS. 1 to 3 illustrate exemplary electrochromic eyewear 1 of the invention. Generally, the electrochromic eyewear 1 may include a frame 10, a left arm 20, a right arm 30, and an electrochromic lens 40. The right arm 30 and left arm 20 may be coupled to the frame 10 via right and left hinges 50 and 60, respectively. The electrochromic eyewear 1 may also include a controller 31, a power source 21, and a photosensor 70. In the various embodiments of the invention, the controller 31 may be in electrical communication with the power source 21, electrochromic lens 40, and photosensor 70, such that the controller 31 may receive a signal from photosensor 70 and, based on that signal, provide a voltage to the electrochromic lens 40 where the controller 31 may be powered by power source 21.

Right arm 30 may include a right arm cover 30A and an inner cover 34 that may be used to provide components that support hinge 50 and enclose and/or protect certain electronic components of the electrochromic eyewear 1. For example, inner cover 34 may enclose controller 31 that may be housed within right arm 30. Moreover, right arm 30 may include a flexible cover 35 that encloses and/or protects certain I/O ports of the controller 31. Flexible cover 35 may be a rubber or silicone cover that may be removed or rotated to reveal certain I/O ports of the controller 31. Right arm 30 may also include hinge 50 that allows right arm 30 to be rotated with respect to frame 10 when a wearer opens the arms of the electrochromic eyewear 1. As described herein, right arm 30 may include a distal end and a proximate end. The proximate end of right arm 30 may include the hinge 50 whereas the distal end of right arm 30 may include a right boot 32, which may be a rubber or silicone boot. The right boot 32 allows the arm to comfortably conform to a user's head and/or ears when the electrochromic eyewear 1 is worn by the user.

Left arm 20 may include a left arm cover 20A and an inner cover 24 (see FIG. 3) that may be used to provide components that support hinge 60 and enclose and/or protect certain electronic components of the electrochromic eyewear 1. For example, inner cover 24 may enclose a power source 21 that may be housed within left arm 20. Left arm 20 may also include hinge 60 that allows left arm 20 to be rotated with respect to frame 10 when a wearer opens the electrochromic eyewear 1. As described herein, left arm 20 may include a distal end and a proximate end. The proximate end of left arm 20 may include the hinge 60 whereas the distal end of left arm 20 may include a left boot 22. The left boot 22 allows the left arm 20 to comfortably conform to a user's head and/or ears when the electrochromic eyewear 1 is worn by the user.

Unless otherwise specified, each of the right arm 30, left arm 20, and frame 10 may be composed of a polymeric material (e.g., Nylon), a metallic material (e.g., aluminum), or a combination thereof.

The frame 10 may be monolithic or it may be composed of two or more portions. In certain embodiments of the invention, the frame 10 may include a rear frame portion 11 and a front frame portion 12. The frame 10 may include several windows or apertures, such as a left electrochromic aperture 13, and a right electrochromic aperture 14 through which light may pass through electrochromic lens 40 to a user's left and right eyes, respectively. In addition frame 10 may include a sensor aperture 16, which allows light to pass through electrochromic lens 40 to a sensor (e.g., photosensor 70) disposed behind the aperture 16 and within the frame 10. As shown in FIG. 3, removal of the electrochromic lens 40 reveals a photosensor 70 that may be disposed in photosensor cavity 80 within the frame 10. The frame 10 may also include a nose piece 15, which may be composed of a flexible material such as rubber or silicone to allow the electrochromic eyewear 1 to comfortably conform to a user's nose when the electrochromic eyewear 1 is worn by the user.

Figure 4:
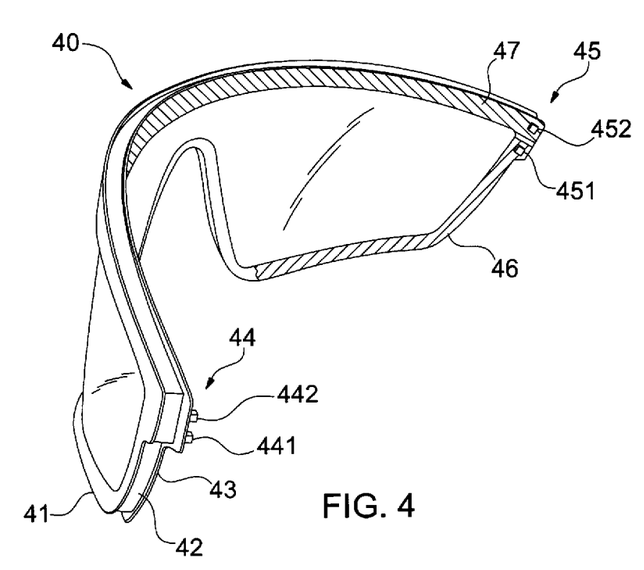
FIG. 4 schematically illustrates a perspective view of an exemplary electrochromic lens of the invention.

FIG. 4 illustrates an exemplary electrochromic lens 40 of the invention that may include electrochromic materials that change color or opacity upon application of a voltage. The electrochromic lens 40 may, by example, be one fabricated using a "sandwich" configuration with two individual pieces comprising a layer of electrochromically active material such as a conducting polymer (CP) deposited on a transparent conductive substrate such as indium tin oxide (ITO) on poly(ethylene terephthalate) (PET), with a layer of gel or solid electrolyte disposed between these two pieces, where the entire lens is edge-sealed. The electrochromic lenses of the invention may include those described in U.S. Pat. Nos. 5,995,273, and 6,033,592; and U.S. Patent Application Publication No. 2013/0120821, the entireties of which are incorporated herein by reference.

In an exemplary embodiment, the electrochromic lens 40 may include a front lens surface 41, an electrochromic material layer 42, and a rear lens surface 43. For example, the electrochromic material layer 42 may include two or more conducting polymeric material layers (e.g., a cathodically coloring conductive polymeric material and an anodically coloring conductive polymeric material) with an electrolyte material layer disposed therebetween (see, e.g., U.S. Pat. Nos. 5,995,273, and 6,033,592; and U.S. Patent Application Publication No. 2013/0120821). As used herein, a "coloring conductive polymeric material" is said to be "anodically coloring" if application of a positive voltage to it causes it to transition to a colored or dark state, and "cathodically coloring" if application of a negative voltage causes it to transition to a colored or dark state. Moreover, cathodically and anodically coloring conductive polymeric materials may comprise cathodically and anodically coloring polymers, respectively. In certain embodiments, the electrochromic lens 40 may include an electrochromic material selected from the group consisting of poly(aniline), poly(diphenylamine), poly(4-amino biphenyl), poly(3-alkyl thiophene), poly(phenylene), poly(phenylene vinylene), poly(alkylene vinylenes), poly(amino quinolines), poly(diphenyl benzidine), poly(2,2-dibenzyl-3,4-propylenedioxythiophene), poly(2,2-bis(4-chloro-benzyl)-3,4-propylenedioxythiophene), poly(2,2-bis(4-bromo-benzyl)-3,4-propylenedioxythiophene), poly(2,2-bis(4-nitro-benzyl)-3,4-propylenedioxy thiophene), and combinations thereof.

The front lens surface 41 may include a transparent conductive substrate (e.g., ITO/Mylar) with an optional protective material (e.g., polycarbonate) disposed thereon. For example, the front lens surface 41 may include an outermost layer of polycarbonate film or layer that may be bonded using a UV- or pressure-cured, optically transparent adhesive, as known by a person having ordinary skill in the art, to a transparent conductive substrate, which is then connected to the electrochromic material layer 42. The rear lens surface 43 may include a transparent conductive substrate (e.g., ITO/Mylar) with an optional protective material (e.g., polycarbonate) disposed thereon. However, in preferred aspects, the rear lens surface 43 includes a transparent conductive substrate without an optional protective material. Where the front lens surface 41 includes a polycarbonate outermost surface bonded therein, the electrochromic eyewear may meet ballistic protection standards and other standards conforming to the ANSI Z87.1 (2014) specification.

The front and rear lens surfaces 41 and 43 may also include left and right electrical contacts 44 and 45, respectively, which may allow the electrochromic lens 40 to receive a voltage for application across the electrochromic material layer 42. For example, electrical contact 44 may include first contact 441 and second contact 442. Electrical contact 45 may include first contact 451 and second contact 452. First contacts 441 and 451 may be in electrical communication with a first polymeric layer of the electrochromic material layer 42 (e.g., a counter electrode) through a conducting trace 46. The conducting trace 46 may be a conductive material (e.g., a layer of silver) disposed on the rear lens surface 43 that connects first contacts 441 and 451 to the first polymeric layer of the electrochromic material layer 42. Second contacts 442 and 452 may be in electrical communication with a second polymeric layer of the electrochromic material layer 42 (e.g., a working electrode) through a conducting trace 47. The conducting trace 47 may be a conductive material (e.g., a layer of silver) disposed on the rear lens surface 43 that connects second contacts 442 and 452 to the second polymeric layer of the electrochromic material layer 42.

According to another embodiment of the invention, the electrochromic eyewear 1 may be provided with prescription inserts that may be affixed to a portion of the frame 10, or may be disposed in connection to electrochromic lens 40, such that users who may require prescriptive lenses (e.g., for near or far sightedness) are not impeded in vision when using the electrochromic eyewear 1 of the invention.

Additionally, the frame 10 may be fitted such that the electrochromic lens 40 and, more particularly, front surface 41 (e.g., an outer polycarbonate or other material) or rear surface 43, may be snapped into the frame 10 as well as removed therefrom, through the provision of machined grooves in the frame where the lens 40 may be placed, which provide a snap fitting between the electrochromic lens 40 and the frame 10. In addition, a set of spring-loaded contact pads (e.g., contacts 551, 552, 651, and 652) within the frame 10 may facilitate electrical connection of the electrodes of the lens 40 (e.g., contacts 44 and 45) with the controller 31. By comparing FIGS. 4, 8, and 9, when an electrochromic lens 40 is disposed in frame 10 (1) first and second contacts 441 and 442 of electrical contact 44 may touch first and second lens contacts 651 and 652, respectively, of left flexible electrical conduit 65; and (2) first and second contacts 451 and 452 of electrical contact 45 may touch first and second lens contacts 551 and 552, respectively, of right flexible electrical conduit 55.

The spring-loaded contact pads may provide a biasing pressure or force against the electrochromic lens 40, thereby holding it in place in the frame 10. This may serve to both ease the requirements of manufacture as well as allow for simple replacement of the lens 40.

Figure 5:
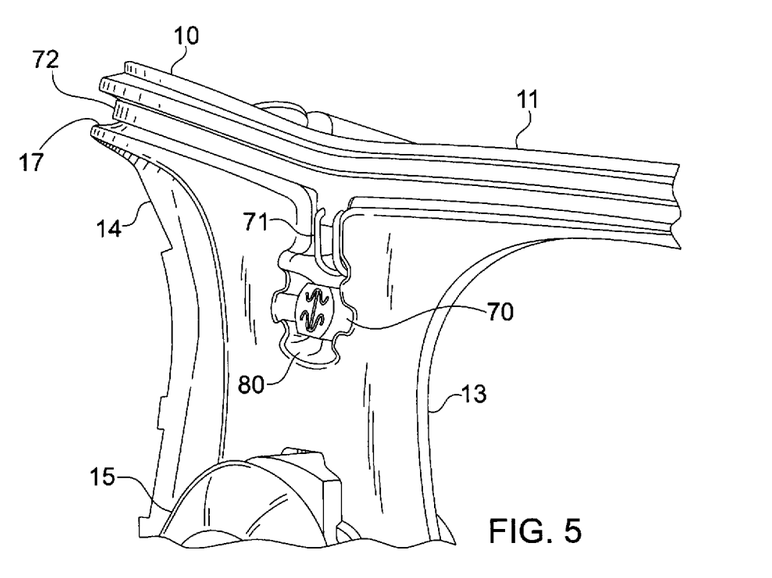
FIG. 5 schematically illustrates a photosensor and photosensor cavity of the exemplary electrochromic eyewear with the front frame portion removed.
Figure 6:
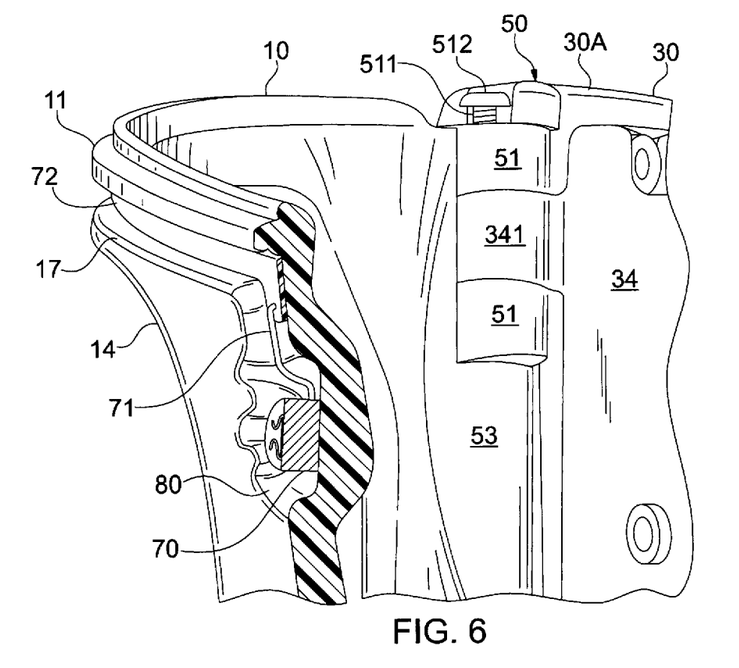
FIG. 6 schematically illustrates a cross-section of the photosensor and photosensor cavity of the exemplary electrochromic eyewear with the front frame portion removed.

FIGS. 5 and 6 show a detailed view of frame 10 where the front frame portion 12 has been removed, thereby exposing rear frame portion 11. The front frame portion 12 may releaseably connect to the rear frame portion 11 by way of a snap-fitting. For example, the outermost edges of the front frame portion 12 may be sized to match the edges of rear frame portion 11 such that when front frame portion 12 is pressed against rear frame portion 11, the two portions connect until a biasing force is used to disconnect the two portions. Moreover, the front frame portion 12 and rear frame portion 11 may be connected (or otherwise maintained in connection) through pins 511 and 611 at hinges 50 and 60, respectively. The front frame portion 12 may be fastened to rear frame portion 11 with one or more fasteners including, but not limited to, screws, snaps, and/or clips. However, in certain embodiments, the fastener may be one or more snap fittings as described herein.

As shown in FIGS. 5 and 6, the rear frame portion 11 may include a photosensor 70 connected to or otherwise deposited in a photosensor cavity 80. The photosensor 70 may be connected to a controller of the invention (e.g., controller 31). Indeed, photosensor 70 may include photosensor leads 71, which may be connected to wiring 72, where wiring 72 includes two or more wires connecting the photosensor leads to a controller (e.g., controller 21). In preferred embodiments, photosensor 70 may be disposed in electrical communication with the controller 31 through photosensor leads 71 and wiring 72. Rear frame portion 11 may include a wire channel 17 that may enclose a portion of the wiring 72.

Photosensor cavity 80 may be provided in a recess on the rear frame portion 12. Moreover, depositing the photosensor 70 within photosensor cavity 80 allows the photosensor 70 to be placed behind the electrochromic lens 40 and, for example, in close proximity to a user's eyes, such that light incident at the photosensor 70 may be substantially the same as that at the user's eyes. Moreover, the photosensor cavity 80 protects the photosensor 70 from exposure to direct light (e.g., direct sunlight or a beam of bright light directed towards the user), which would otherwise distort the output of the photosensor 70 in the absence of photosensor cavity 80. In certain embodiments, photosensor cavity 80 may include a conical cross-section, a frustoconical cross-section, a fluted conical cross-section, or a fluted frustoconical cross-section.

According to another embodiment of the invention, a flexible circuit may be provided that may be embedded into the frame 10 and hidden from view. The flex circuit may provide the means for electrically connecting all components that may require electrical connections. As described herein, hinge components (e.g., components of hinges 50 and 60) may be provided that may connect right and left portions of the arms 30 and 20, respectively, to the main eyewear frame 10. These may be specially configured to allow facile passage of the flexible circuit without affecting the electrical connections in the eyewear when the temples are opened or closed.

FIGS. 6 to 12 illustrate the right and left hinges 50 and 60 that connect right and left arms 30 and 20, respectively, to the frame 10. Generally, the right and left hinges 50 and 60 are configured to include passthroughs that allow a flexible circuit (i.e., "flex circuit") to pass through the hinges 50 and 60 while being enclosed within the electrochromic eyewear 1. Indeed, the passthroughs and flex circuits of the invention allow for wiring 72 and right and left flexible electrical conduits 55 and 65 to pass through the arms 30 and 20, respectively, to connect with the photosensor 70 or the electrochromic lens 40, as necessary for operation of the electrochromic eyewear 1. As used herein, the "flexible circuit" comprises wiring 72 and conduits 55 and 65. Accordingly, the passthroughs and flexible circuits of the invention allow the arms 30 and 20 to be folded, unfolded, or otherwise rotated by the user without impairing the function of the electrochromic eyewear 1. Therefore, the electrochromic eyewear 1 may function when both arms 30 and 20 are in their completely folded position.

As shown in FIGS. 6 to 12, various portions of the rear frame portion 11, front frame portion 12, inner covers 24 and 34, and outer covers 20A and 30A, may include knuckles, pins, and other components that may combine to form passthroughs in the right hinge 50 and left hinge 60 to allow a flexible circuit (e.g., conduits 55 and 65 and wiring 72) to pass from arms 30 and 20 into frame 10.

For the purposes of this application, unless otherwise specified, hinges 50 and 60 may include identical components. Therefore, in certain instances, only the components of hinge 50 will be described with the understanding that identical counterparts are provided at hinge 60.

The components of hinge 50 may include, for example, top arm knuckle 51 and bottom arm knuckle 52. Both top arm knuckle 51 and bottom arm knuckle 52 may be disposed on right arm cover 30A. Moreover, top arm knuckle 51 may have a space disposed therein, which may be right electrical passthrough 54. As described above, wiring 72 and a right flexible electrical conduit 55 may be configured to pass through right electrical passthrough 54.

Figure 7:
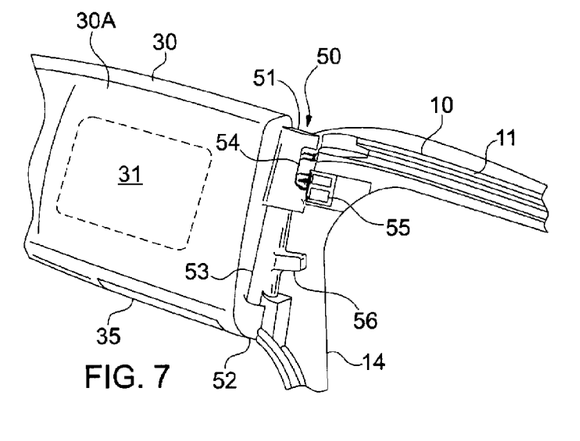
FIG. 7 schematically illustrates a perspective view of a right hinge of the exemplary electrochromic eyewear with the front frame portion removed.

Hinge 50 may also include an eyewear frame knuckle 53. Eyewear frame knuckle 53 may be disposed on rear frame portion 11. Moreover, as shown in FIG. 7, Eyewear frame knuckle 53 may be interposed between top arm knuckle 51 and bottom arm knuckle 52.

Hinge 50 may also include a right passthrough cover 341 that may enclose a portion of the passthrough 54 and may be interposed between two portions of the top arm knuckle 51. The right passthrough cover 341 may be disposed on right inner cover 34.

Hinge 50 may also include one or more pins that may be placed through a rotational axis of the hinge 50. The pins may be placed through a portion of one or more knuckles of the hinge 50 (e.g., knuckles 51, 53, and/or 54) to both provide an axis of rotation and interlock the one or more knuckles of the hinge 50.

For example, hinge 50 may include a top pin 511 that may have a top pin cap 512. The top pin 511 may be disposed through a portion of the top arm knuckle 51. The top pin 511 may be smooth or threaded. For example, top pin 511 may be threaded and may comprise a screw that fits into a first sleeve 513 that may be disposed within a first portion of the top arm knuckle 51. Moreover, hinge 50 may include a bottom pin 521 that may have a bottom pin cap 522. The bottom pin 521 may be disposed through a portion of the bottom arm knuckle 52. The bottom pin 521 may be smooth or threaded. For example, bottom pin 521 may be threaded and may comprise a screw that fits into a portion of the right eyewear frame knuckle 53.

Hinge 50 may also include a frame pin 531 that may be disposed within the eyewear frame knuckle 53. In certain aspects, the frame pin 531 may be smooth or threaded. The frame pin 531 may be a smooth pin that interconnects bottom arm knuckle 52, eyewear frame knuckle 53, and a second portion of the top arm knuckle 51. For example, the frame pin 531 and bottom pin 521 may comprise the same pin that passes through and thereby interconnects bottom arm knuckle 52, eyewear frame knuckle 53, and a second portion of the top arm knuckle 51.

Furthermore, hinge 50 may include a boss 514 that may be disposed on the eyewear knuckle 53. For example, boss 514 may be a sleeve or peg that projects from the eyewear frame 53 and is received by a second portion of the top arm knuckle 51. Where boss 514 is a sleeve, it may receive a portion of the frame pin 531.

Additionally, hinge 50 may include front frame knuckle 57. Front frame knuckle 57 may be disposed on the front frame portion 11. Top pin 511 may be disposed through a portion of the front frame knuckle 57. Indeed, in certain embodiments, top pin 511 may be disposed within front frame knuckle 57 and a first portion of the top arm knuckle 51, thereby interconnecting front frame knuckle 57 and top arm knuckle 51.

Figure 8:
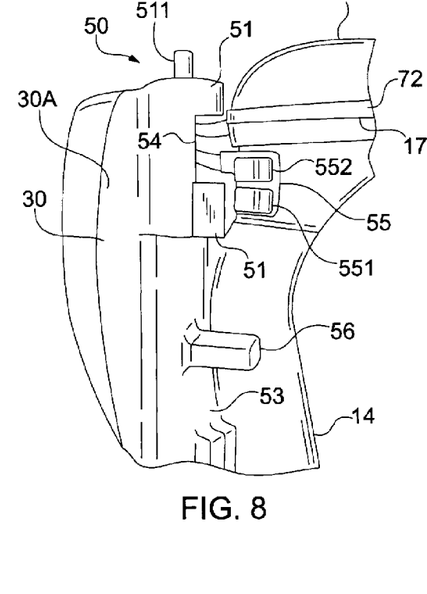
FIG. 8 schematically illustrates a front view of the right hinge of the exemplary electrochromic eyewear with the front frame portion removed.
Figure 9:
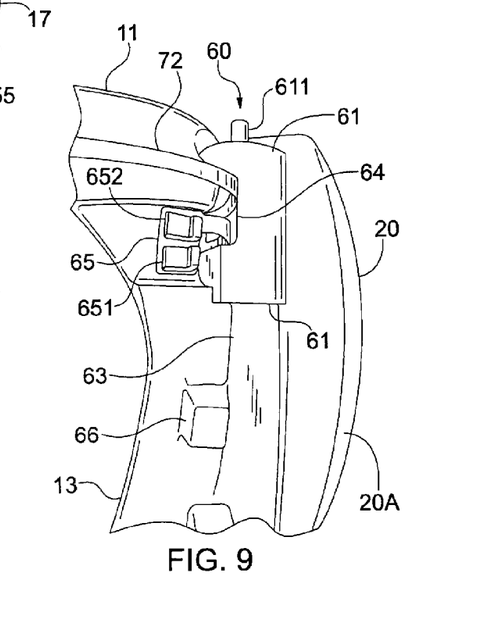
FIG. 9 schematically illustrates a front view of a left hinge of the exemplary electrochromic eyewear with the front frame portion removed.
Figure 10:
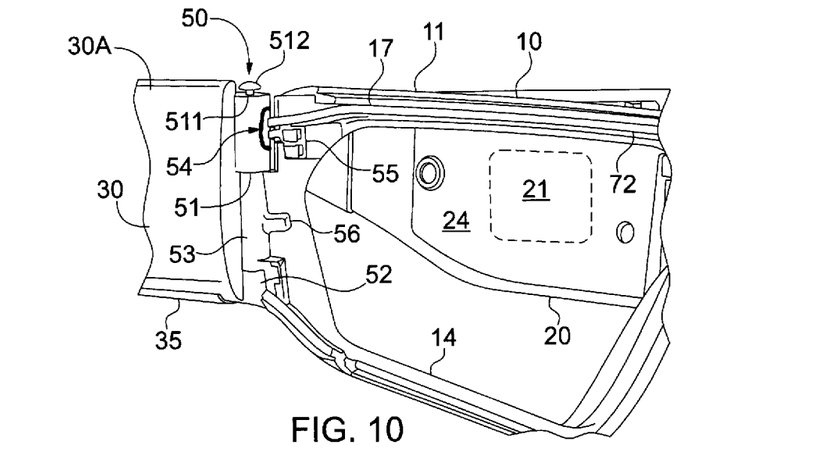
FIG. 10 schematically illustrates a side view of the right hinge of the exemplary electrochromic eyewear with the front frame portion removed.

As shown in FIGS. 8 and 9, the right and left hinges 50 and 60, respectively may include top arm knuckles 51, 61. The top arm knuckles 51,61 may provide electrical passthroughs 54,64, through which electrical conduits 55,65 and wiring 72 (i.e., the flexible circuit) may pass. Right and left hinges 50 and 60 may also include top pins 511,611. Moreover, top arm knuckles 51,61 may be interconnected with eyewear frame knuckles 53,63.

In other embodiments of the invention, rear frame portion 11 may include one or more electrochromic lens supports or supporting bosses that may support a portion of the electrochromic lens 40 when the lens is fitted into the frame 10. For example, rear frame portion 11 may include electrochromic lens supports 56 and 66, which may be proximate to the eyewear frame knuckles 53 and 63, respectively.

Regarding the flexible conduits of the flexible circuit described herein, right flexible electrical conduit 55 may pass through right electrical passthrough 54 and may have an end portion that is connected to rear frame portion 11. Moreover, the end portion of the right flexible electrical conduit 55 may include first and second lens contacts 551 and 552. As described herein, first and second lens contacts 551 and 552 may be snap fittings that may releaseably connect to contacts 451 and 452 of right contact 45 of an electrochromic lens 40. Indeed, first and second lens contacts 551 and 552 may include clips, for example, that clip, and releaseably connect, to contacts 451 and 452 of right contact 45 such that the first and second lens contacts 551 and 552 may be in electrical communication with the electrochromic lens 40.

As used herein, the term "snap fit" or "snap fitting" may describe a type of connection between two components that fastens the two components together, generally without requiring any tools. A snap-fitting connection of two components of the invention may allow for releaseably locking two components, where the two components may be unlocked without damage. Accordingly, the terms "snap fit" or "snap fitting" encompass a connection of two components using portions of the components themselves, as would be known by someone having ordinary skill in the art in light of this specification.

In similar fashion to conduit 55, left flexible electrical conduit 65 may pass through left electrical passthrough 64 and may have an end portion that is connected to rear frame portion 11. Moreover, the end portion of the left flexible electrical conduit 65 may include first and second lens contacts 651 and 652. As described herein, first and second lens contacts 651 and 652 may be snap fittings that may releaseably connect to first and second contacts 441 and 442 of left contact 44 of an electrochromic lens 40. Indeed, first and second lens contacts 651 and 652 may include clips, for example, that clip, and releaseably connect, to first and second contacts 441 and 442 of right contact 44 such that the first and second lens contacts 651 and 652 may be in electrical communication with the electrochromic lens 40.

Figure 12:
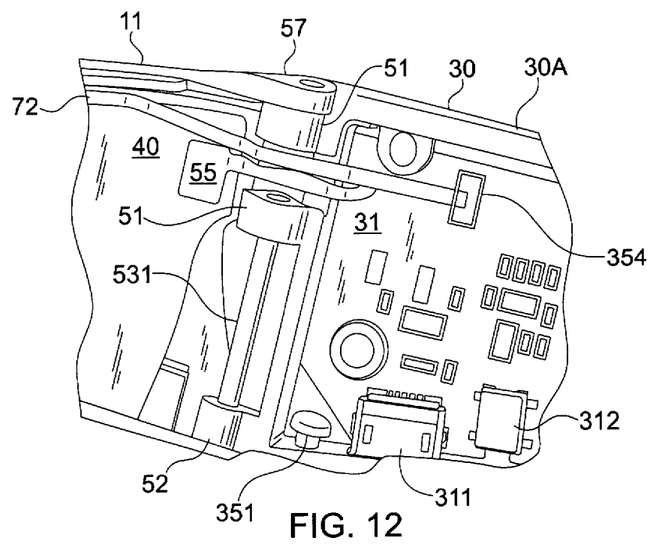
FIG. 12 schematically illustrates a rear view of the right hinge with the rear frame portion removed.

In other aspects of the invention, the electrochromic eyewear 1 may include a controller 31. The controller 31 may be provided in either left arm 20 or the right arm 30. For example, the controller 31 may be disposed within the right arm 30 as shown in FIGS. 1 and 12. Generally, the controller 31 may be connected to wiring 72. As would be appreciated by a person having ordinary skill in the art, in light of this specification, the wiring 72 may include a plurality of wires that provide electrical communication between: (1) the power source 21 and the controller 31; (2) contacts 651 and 652 of flexible electrical conduit 65 and the controller 31; (3) contacts 551 and 552 of flexible electrical conduit 55 and the controller 31; and (4) the photosensor 70 and the controller 31. Accordingly, wiring 72 may include a bundle of individual wires that provide a circuit that allows the controller 31 to receive a signal from the photosensor 70 and provide a voltage to the electrochromic lens 40 through two or more of contacts 551, 552, 651, and 652, where the controller 31 is powered by the power source 21. Wiring 72 (which may include one or more wires from the flexible conduits 55 and 65), may be connected to the controller at connector 354.

Regarding the controller 31 more specifically, the controller 31 (e.g., controller circuit), which is in electrical communication with photosensor 70, electrochromic lens 40, and power source 21, may be configured to deliver a continuous voltage or potential that is pulsed to the electrochromic lens 40 in response to a photosensor potential that is generated by photosensor 70. The controller 31 may include a potentiostat. In preferred embodiments of the invention, the controller 31 is a controller circuit that includes an amplifier, a voltage regulator, and microcontroller unit (MCU), as set forth, for example, U.S. Pat. No. 8,902,486, the entirety of which is incorporated herein by reference.

In other embodiments of the invention, the controller 31 may include one or more I/O ports or connectors that may facilitate: (1) communication with the controller 31; (2) charging of the power source 21; (3) activation or deactivation of the electrochromic eyewear 1; and (4) one or more indicators that indicate a status of the electrochromic eyewear.

For example, the controller 31 may include a port 311, which may be a USB port or a micro-USB (μ-USB) port. The controller 31 may include an ON/OFF switch 312, which may include a toggle for activating or deactivating the controller 31 and thereby the device. The controller 31 may also include one or more LED indicators that may be visible on a surface of the electrochromic eyewear 1 that may indicate one or more of battery life and a device activation status (e.g., on or off).

Figure 11:
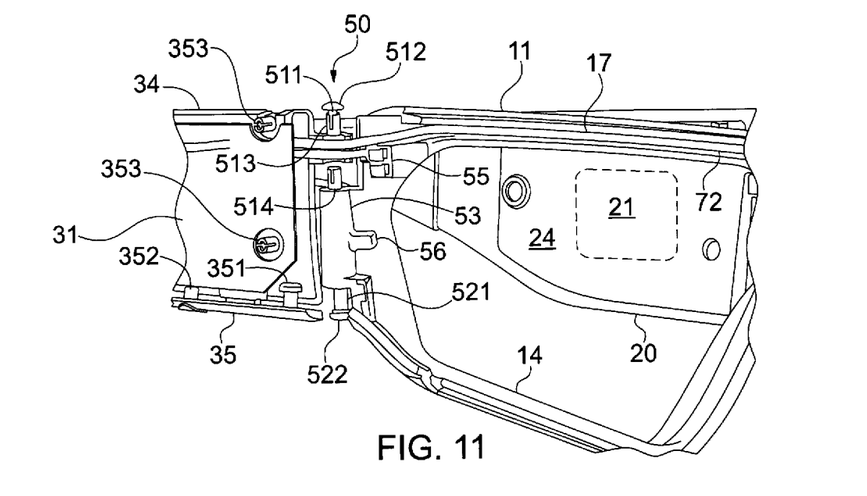
FIG. 11 schematically illustrates a side view of the right hinge of the invention with the right arm cover and front frame portion removed.

As shown in FIGS. 11 and 12, the port 311 and ON/OFF switch 312 may be covered and protected by flexible cover 35. Flexible cover 35 may be connected at the right arm cover 30A with a lug 351 that may provided through an opening in flexible cover 35, and may include a stopper that prevents it from being completely separated from the right arm cover 30A. However, the lug 351 provides enough freedom for a user to open or rotate the flexible cover 35 such that the user may access the port 311, for example. The flexible cover 35 may also include a flexible pin 352 that may project into an opening of right arm cover 30A, and may frictionally engage with a surface of the right arm cover 30A. Alternatively, flexible pin 352 may engage with a button or switch (e.g., ON/OFF switch 312) and allow a user to activate and deactivate the electrochromic eyewear.

In another aspect, as shown in FIG. 11, right inner cover 34 may include one or more fasteners 353 that may be used fasten the right inner cover 34 to right outer arm 30A.

Preferably, the electrochromic lens 40 may be controlled by a microchip-based controller (i.e., controller 31) that uses a signal from the photosensor (e.g., photosensor potential) of the ambient light level and a pre-set, desired light level behind the electrochromic lens 40 at the photosensor 70, which is disposed within photosensor cavity 80 (e.g., at the eye level of the wearer in the case of electrochromic sunglasses). Furthermore, the controller 31 allows for voltage application only to achieve the desired % Transmission (% T) of the electrochromic system (i.e., the desired light level), after which the voltage application ceases and the controller 31 goes into a dormant, monitoring-only mode (monitoring the ambient light level via the photosensor output (i.e., photosensor potential), thus greatly conserving battery power.

In practical use of the electrochromic eyewear 1 of the invention, the light level desired at the eye may be first set using a desired voltage output of the photosensor 70 corresponding to the desired figure in lumens via a lookup table, using software that may be provided in a storage medium of the controller 31. The software may be downloaded into the controller 31 where it may reside in the storage medium (e.g., a non-transitory storage medium such as a hard drive, solid state drive, or the like), which may include an EPROM, facilitated by a connection to a laptop computer or mobile device (e.g., a phone), for example. Following this step, the electrochromic eyewear 1 may function in a fully automated fashion as follows: the photosensor output, based on the light incident on the side of the electrochromic lens away from the light source, may be used by the software to apply an applied-voltage algorithm on the lens 40, such that the lightness or darkness of the lens 40 may be adjusted to ensure the pre-selected light level at the eye. Such algorithms and methods are provided in U.S. Pat. No. 8,902,486, the entirety of which is incorporated by reference herein.

Furthermore, the electrochromic eyewear 1 may include a power source 21. The power source 21 may be provided in either left arm 21 or the right arm 30. For example, the power source 21 may be disposed within the left arm 20 as shown in FIGS. 1 and 11. The power source 21 may provide a potential or voltage to the controller 31. The power source 21 may include any source of direct current (DC) to the controller 31 and/or electrochromic lens 40. In certain embodiments, the power source 21 may include a source of alternating current (AC) that is converted to DC, as is known in the art. Preferably, the power source 21 is a battery. As used herein, the term "battery" refers to an electro-chemical device comprising one or more electro-chemical cells and/or fuel cells, and so a battery may include a single cell or plural cells, whether as individual units or as a packaged unit. A battery is one example of a type of an electrical power source suitable for a portable device.

According to another embodiment of the invention, a power source 21 such as a rechargeable Li ion battery is provided. If a rechargeable Li battery is used, the electrochromic eyewear 1 may be recharged for a few hours, similar to, for example, a cell phone.

With regard to the present invention, both the power source 21 and the controller 31 may be disposed within the left arm 20 or the right arm 30. When both the power source 21 and the controller 31 are placed within the same arm (i.e., arm 20 or 30), the other arm may include a counterweight to ensure that both the left arm 20 and right arm 30 are balanced.

In certain embodiments, the fully automated, ambient-light-dependent function of the eyewear 1 allows the user to keep the eyewear on at all times, regardless of whether or not he or she is indoors or outdoors, in cloudy or brightly sunny conditions, or under intense artificial illumination, such as from a spotlight. Such features may be especially convenient for industrial workers, construction crews, and sportspersons, for example. Additionally, the electrochromic eyewear of the invention may work equally well indoors and in automobiles, unlike photochromics, which may require the UV component of sunlight to function and thus do not efficiently function indoors or in automobiles.

A number of patent and non-patent publications are cited herein in order to describe the state of the art to which this invention pertains. The entire disclosure of each of these publications is incorporated by reference herein.

While certain embodiments of the present invention have been described and/or exemplified above, various other embodiments will be apparent to those skilled in the art from the foregoing disclosure. The present invention is, therefore, not limited to the particular embodiments described and/or exemplified, but is capable of considerable variation and modification without departure from the scope and spirit of the appended claims.

Moreover, as used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Furthermore, the transitional terms "comprising", "consisting essentially of" and "consisting of" when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinary associated with the specified material(s). The term "consisting essentially of" limits the scope of a claim to the specified elements, steps or material(s) and those that do not materially affect the basic and novel characteristic(s) of the claimed invention. All devices and methods described herein that embody the present invention can, in alternate embodiments, be more specifically defined by any of the transitional terms "comprising," "consisting essentially of," and "consisting of."

What is claimed is:

1. Electrochromic eyewear comprising:
   a. an eyewear frame comprising:
      i. a first arm and a first hinge that connects the first arm to the eyewear frame;
      ii. a second arm and a second hinge that connects the second arm to the eyewear frame; and
      iii. a photosensor cavity comprising a conically-shaped cross-section;
   b. an electrochromic lens connected to the eyewear frame that covers the photosensor cavity;
   c. a photosensor contained within the photosensor cavity and configured to receive light and convert such light to a photosensor potential;
   d. a controller contained within at least one of the first and second arms in electrical communication with the photosensor and the electrochromic lens, the controller configured to deliver a voltage to the electrochromic lens in response to the photosensor potential; and
   e. a power source contained within at least one of the first and second arms in electrical communication with the controller.

2. The eyewear of claim 1, wherein the electrochromic lens comprises a single lens.

3. The eyewear of claim 2, wherein the electrochromic lens comprises an electrochromic material and a protective material.

4. The eyewear of claim 3, wherein the protective material comprises polycarbonate.

5. The eyewear of claim 3, wherein the electrochromic material comprises an electrochromic conducting polymer selected from the group consisting of: poly(aniline), poly (diphenylamine), poly(4-amino biphenyl), poly(3-alkyl thiophene), poly(phenylene), poly(phenylene vinylene), poly(alkylene vinylenes), poly(amino quinolines), poly(diphenyl benzidine), poly(2,2-dibenzyl-3,4-propylenedioxythiophene), poly(2,2-bis(4-chloro-benzyl)-3,4-propylenedioxythiophene), poly(2,2-bis(4-bromo-benzyl)-3,4-propylenedioxythiophene), poly(2,2-bis(4-nitro-benzyl)-3,4-propylenedioxythiophene), and combinations thereof.

6. The eyewear of claim 1, wherein the frame comprises a front portion and a rear portion with the electrochromic lens disposed between the front portion and the rear portion.

7. The eyewear of claim 6, wherein the front portion comprises a first lens aperture, a photosensor aperture, and a second lens aperture.

8. The eyewear of claim 6, wherein the rear portion comprises the photosensor cavity with the photosensor being positioned behind the electrochromic lens.

9. The eyewear of claim 8, wherein the photosensor cavity comprises a conical cross-section, a frustoconical cross-section, a fluted conical cross-section, or a fluted frustoconical cross-section.

10. The eyewear of claim 6, wherein the first and second hinges comprise first and second electrical passthroughs and the rear portion comprises a wire channel that connects the first electrical passthrough, the photosensor cavity, and second electrical passthrough.

11. The eyewear of claim 10, comprising a flexible circuit configured to maintain electrical communication between the electrochromic lens, the controller, and the power source, the flexible circuit comprising:
   i. electrical contact pads connected to the rear portion and configured to releaseably contact the electrochromic lens; and
   ii. a flexible electrical conduit that connects the electrical contact pads to the controller through at least one of the first and second electrical passthroughs.

12. The eyewear of claim 11, wherein the electrical contact pads comprise spring-loaded contacts configured to provide a bias pressure against the electrochromic lens.

13. The eyewear of claim 6, wherein the eyewear frame comprises a snap fitting that releaseably connects the electrochromic lens to the eyewear frame.

14. The eyewear of claim 6, wherein the front portion and rear portion comprise a fastener configured to releaseably connect the front portion to the rear portion.

15. The eyewear of claim 1, wherein the controller is contained within the first arm and the power source is contained in the second arm.

16. The eyewear of claim 1, wherein both the controller and the power source are contained within one of the first and second arms.

17. Electrochromic eyewear comprising:
   a. an eyewear frame comprising a first arm and a second arm, wherein at least one of the first and second arms comprise a hinge that connects the arm to the eyewear frame, the hinge comprising a set of interconnected knuckles and an electrical passthrough disposed within the set of interconnected knuckles; wherein the arm can rotate upon the hinge between an open and closed position;
   b. an electrochromic lens connected to the eyewear frame comprising electrical contacts;
   c. a controller contained within at least one of the first and second arms in electrical communication with the electrochromic lens, the controller configured to deliver a voltage to the electrochromic lens to vary the transmittance (% T) of the electrochromic lens in response to a stimulus transmitted to the controller;
d. a power source contained within at least one of the first and second arms in electrical communication with the controller; and
e. a flexible circuit configured to maintain electrical communication between the electrochromic lens and the controller when at least one of the first and second arms is in their open or closed position, comprising:
   i. electrical contact pads connected to the eyewear frame and configured to releaseably contact the electrical contacts of the electrochromic lens; and
   ii. a flexible electrical conduit that connects the electrical contact pads to the controller through the electrical passthrough.

18. The eyewear of claim 17, wherein the first and second arms comprise first and second hinges, respectively, having a first and second set of interconnected knuckles with first and second electrical passthroughs disposed within the sets of interconnected knuckles.

19. The eyewear of claim 17, wherein the set of interconnected knuckles comprises an arm knuckle and an eyewear frame knuckle.

20. The eyewear of claim 19, wherein the arm knuckle comprises the electrical passthrough.

21. The eyewear of claim 17, wherein the electrochromic lens comprises a single lens.

22. The eyewear of claim 21, wherein the electrochromic lens comprises an electrochromic material and a protective material.

23. The eyewear of claim 22, wherein the protective material comprises polycarbonate.

24. The eyewear of claim 22, wherein the electrochromic material comprises an electrochromic conducting polymer selected from the group consisting of: poly(aniline), poly(diphenylamine), poly(4-amino biphenyl), poly(3-alkyl thiophene), poly(phenylene), poly(phenylene vinylene), poly(alkylene vinylenes), poly(amino quinolines), poly(diphenyl benzidine), poly(2,2-dibenzyl-3,4-propylenedioxythiophene), poly(2,2-bis(4-chloro-benzyl)-3,4-propylenedioxythiophene), poly(2,2-bis(4-bromo-benzyl)-3,4-propylenedioxythiophene), poly(2,2-bis(4-nitro-benzyl)-3,4-propylenedioxythiophene), and combinations thereof.

25. The eyewear of claim 17, wherein the frame comprises a front portion and a rear portion with the electrochromic lens disposed between the front portion and the rear portion.

26. The eyewear of claim 25, wherein the frame comprises a photosensor cavity comprising a conically-shaped cross-section.

27. The eyewear of claim 26, comprising a photosensor in electrical communication with the controller and contained within the photosensor cavity, wherein the photosensor is positioned behind the electrochromic lens.

28. The eyewear of claim 27, wherein the front portion comprises a first lens aperture, a photosensor aperture, and a second lens aperture.

29. The eyewear of claim 26, wherein the photosensor cavity comprises a conical cross-section, a frustoconical cross-section, a fluted conical cross-section, or a fluted frustoconical cross-section.

30. Eyewear having removable electrochromic lenses, the eyewear comprising:
a. an eyewear frame comprising:
   i. first and second arms connected by first and second hinges, respectively, to the eyewear frame;
   ii. a rear portion comprising an electrochromic lens snap fitting and spring-loaded electrochromic lens contact pads; and
   iii. a front portion having a fastener configured to releaseably connect the front portion to the rear portion;
b. an electrochromic lens disposed between the front portion and rear portion of the eyewear frame, wherein the electrochromic lens snap fitting and the spring loaded electrochromic lens contact pads are configured to releaseably connect the electrochromic lens to the rear portion;
c. a photosensor connected to the rear portion of the eyewear frame and configured to receive light and convert such light to a photosensor potential; and
d. a controller contained within at least one of the first and second arms in electrical communication with the electrochromic lens and the photosensor, wherein the controller is configured to deliver a voltage to the electrochromic lens through the spring-loaded electrochromic lens contact pads in response to the photosensor potential.

* * * * *